Patented June 6, 1944

2,350,814

UNITED STATES PATENT OFFICE 2,350,814

INSECTICIDE

Hans von Philipp, Leipzig, Germany; vested in the Alien Property Custodian

No Drawing. Application July 24, 1940, Serial No. 347,311. In Germany August 2, 1935

8 Claims. (Cl. 167—22)

This invention relates to insecticides and is directed more particularly to insecticides of the character disclosed in my co-pending application Serial No. 157,063, filed August 2, 1937, now Patent No. 2,214,782, of which this application is a continuation-in-part.

In the course of the exploration and examination of new insecticides, there was made the surprising discovery, that in general the insecticidal effect is very considerably increased, by adding to one or more insecticidal substances small quantities of one or more other insecticidal substances. As a remarkable matter of fact it has been found, that generally additions of a few per cent of an insecticidal substance—often only 0.5%—are sufficient to increase the efficacy of another insecticidal substance very considerably. In many cases the efficacy has even been multiplied.

Examples

1. On examining the efficacy of a composition of 98% of hexachlorethane and 2% of an insecticide "M" on moths (butterflies), it was found that these butterflies were killed after 1½–2 hours. Hexachlorethane itself will kill the moths (butterflies) under the same conditions only after 24 hours, whereas the product "M" kills them after 1¼ hours. Thus, the effect obtained by the addition of 2% of the insecticide "M" means in this case a reduction of the necessary time to kill the moths to about one-tenth of the time, which is necessary when using hexachlorethane only. (Product "M" is acetonechloroform.)

2. By the addition of 5% of the product "M" to 95% of hexachlorethane the insecticidal efficacy of the latter on moth-worms has been multiplied. The results of three experiments made in a correct manner and under quite the same conditions with four moth-worms each, have in all these cases shown, that this composition requires only 20 hours to kill the moth-worms, whereas hexachlorethane itself kills them only in the course of a fortnight.

My invention can be proved by a number of reports of the "Institut für landwirtschaftliche Zoologie" (Institution for Agricultural Zoology) of the University of Berlin.

The very important technical effect of my invention is due partly to the fact, that by the above described combination, which is characterised by an insignificant addition of one or more insecticidal substances to one or more other insecticidal substances, the efficacy is increased in such a degree, that it surpasses the efficacy of the single insecticidal substances used in this combination and partly to the fact, that by the addition of only insignificant quantities of a perhaps expensive insecticide of great efficacy—whereupon this invention is based—there will be given the possibility to produce insecticides of specially great efficacy on an economically favorable base.

It is also within the scope of the present invention to increase the effectiveness of insecticides which consist essentially of hexachlorethane, not only by the addition of a small percentage of acetone chloroform thereto (see Examples 1 and 2), but also by the addition of a commensurately small percentage of a chlorinated aromatic compound, such as parachlorbrombenzene, chloronaphthalene, and paradichlorbenzene.

What I claim is:

1. The process of increasing the effectiveness of insecticides which consist essentially of hexachlorethane, which comprises activating the said insecticides by adding thereto a relatively small percentage of a chlorinated aromatic compound of the group consisting of parachlorbrombenzene, chloronaphthalene and paradichlorbenzene.

2. The process of increasing the effectiveness of insecticides which consist essentially of hexachlorethane, which comprises activating the said insecticides by adding thereto a relatively small percentage of parachlorbrombenzene.

3. The process of increasing the effectiveness of insecticides which consist essentially of hexachlorethane, which comprises activating the said insecticides by adding thereto a relatively small percentage of chloronaphthalene.

4. The process of increasing the effectiveness of insecticides which consist essentially of hexachlorethane, which comprises activating the said insecticides by adding thereto a relatively small percentage of paradichlorbenzene.

5. An insecticide which consists essentially of hexachlorethane and which contains, as an activating ingredient, a relatively small percentage of a chlorinated aromatic compound of the group consisting of parachlorbrombenzene, chloronaphthalene and paradichlorbenzene.

6. An insecticide which consists essentially of hexachlorethane and which contains, as an activating ingredient, a relatively small percentage of parachlorbrombenzene.

7. An insecticide which consists essentially of hexachlorethane and which contains, as an activating ingredient, a relatively small percentage of chloronaphthalene.

8. An insecticide which consists essentially of hexachlorethane and which contains, as an activating ingredient, a relatively small percentage of paradichlorbenzene.

HANS VON PHILIPP.